United States Patent [19]

Mous et al.

[11] Patent Number: 5,783,823
[45] Date of Patent: Jul. 21, 1998

[54] APPARATUS TO BE USED IN THE FIELD OF ACCELERATOR MASS SPECTROMETRY

[75] Inventors: Dirk Jozef Willem Mous, Nieuwegein, Netherlands; Andreas Ulrich Gottdang, Altenberge, Germany

[73] Assignee: High Voltage Engineering Europe B.V., Netherlands

[21] Appl. No.: 813,988

[22] Filed: Mar. 10, 1997

[30] Foreign Application Priority Data

Mar. 8, 1996 [EP] European Pat. Off. ............ 96200633

[51] Int. Cl.$^6$ ........................................... H01J 49/26
[52] U.S. Cl. ............................................... 250/281
[58] Field of Search ................................. 250/281, 282; 315/500, 506, 507; 313/362.1

[56] References Cited

U.S. PATENT DOCUMENTS

| | | | |
|---|---|---|---|
| 4,037,100 | 7/1977 | Purser | 250/281 |
| 4,771,171 | 9/1988 | Snyder et al. | 250/281 |
| 5,237,174 | 8/1993 | Purser | 250/281 |

*Primary Examiner*—Kiet T. Nguyen
*Attorney, Agent, or Firm*—Jones, Day, Reavis & Pogue

[57] ABSTRACT

The invention relates to an apparatus to be used in the field of accelerator mass spectrometry for detection of low concentrations of isotopes of interest (including, but not limited to chlorine-36) in order to suppress isobaric interferences from isobars having a lower atomic number Z (also referred to as "interfering isobars") then said isotopes, which apparatus comprises means for an at least twofold deceleration of said isotopes and said isobars by their interaction with matter in order to create an energy difference between said isotopes and said isobars based on the Z-dependence of their deceleration.

11 Claims, 5 Drawing Sheets

APPARATUS TO BE USED IN THE FIELD OF ACCELERATOR MASS SPECTROMETRY

BACKGROUND OF THE INVENTION

1. Field of the Invention

The invention relates to an apparatus to be used in the field of accelerator mass spectrometry (hereinafter also referred to as AMS) for detection of low concentrations of isotopes of interest (including, but not limited to chlorine-36) in order to suppress isobaric interferences from elements having a lower atomic number Z (also referred to as "isobars") than said isotopes.

2. Description of the Prior Art

Such an apparatus is known from U.S. Pat. No. 5,273,174 (Purser). In the last decades accelerator mass spectrometry has been recognized as a technique able to detect extreme low concentrations of isotopes in a sample. Its unparalleled sensitivity results from the absence of molecular interferences and the possibility to suppress isobars (U.S. Pat. No. 4,037,100). In AMS negative ions are extracted from the sample under investigation. After mass analysis, these ions are accelerated in a tandem accelerator to a terminal maintained at a high positive potential. A stripper within this high-voltage terminal converts the negative ions to a positive charge state and induces dissociation of the background molecules. After further acceleration, mass- and energy-analysis is performed and the particles of interest are identified by a measurement of their physical properties. For some elements, AMS rejects the isobar completely, because the interfering isobar does not form stable negative ions, which are required for the injection into a tandem accelerator. This is the case for, among others, $^{14}C$, $^{26}Al$ and $^{129}I$ and consequently these elements, which have a widespread field of applications, can be detected with a sensitivity down to $10^{-15}$ without too many difficulties. In spite of the existence of $^{10}B-$, $^{10}Be$ can also be detected as was shown by Raisbeck et al (see Nucl. Instr. and Meth. B 5 (1984) 175) by the application of an energy absorbing foil that preferably stops ions with a higher nuclear charge. On the other hand, some scientifically important elements like $^{36}Cl$, are well known for their problematic isobar interferences to be detected at concentration levels as low as $10^{-15}$. Because sample pre-treatment and natural abundance reduces the $^{36}S$ content in a sample by approximately $10^{-6}$ and $10^{-4}$ respectively, a further suppression of $10^{5}$ is needed by the AMS instrument to achieve a background of $10^{-15}$. Contrary to the detection of $^{10}Be$, it is believed by those skilled in the art that the application of an energy absorbing foil in the case of $^{36}Cl$ does not give the wanted isobar suppression of $10^{5}$ because of the following two reasons: First, the interfering isobar has a lower atomic number Z than $^{36}Cl$, and as a result a complete separation of the isobars is, as will be discussed later, fundamentally impossible. Secondly, the relative Z difference dZ/Z is considerably smaller, which reduces the energy difference between the $^{36}Cl$ ions and its $^{36}S$ isobar for a given foil thickness. In order to obtain the needed energy difference, the foil must be made so thick that the transmitted beam becomes too divergent to be transported properly under normal conditions. As already mentioned, U.S. Pat. No. 5,237,174 proposes a solution to this isobaric interference, wherein use is made of a so-called "booster accelerator" operating at a terminal voltage of approximately 4 MV.

A disadvantage of the apparatus according to U.S. Pat. No. 5,237,174 is that is makes use of a high terminal voltage, whereby the $^{36}Cl$ ions receive enough energy to enable isobaric suppression in a suitable detector. However, this known apparatus is therefore complicated and, as a consequence, too expensive to have a wide spread use thereof in medium sized research institutes and the like.

SUMMARY OF THE INVENTION

It is an object of the invention to provide an apparatus wherein these disadvantages are obviated and thereto an apparatus of the type mentioned in the preamble according to the invention is characterized in that it comprises means for an at least twofold deceleration of said isotopes and said isobars by their interaction with matter in order to create an energy difference between said isotopes and said isobars based on the Z-dependence of their deceleration. In a preferred embodiment of an apparatus according to the invention said means comprise a (solid) foil acting as interacting matter. In another preferred embodiment these means comprise a gas or a plasma acting as interacting matter. Because in two steps an isobaric suppression of particularly 1000 and 300, respectively, is achieved, an overall suppression of $10^{5}-10^{6}$ is anticipated, being high enough to allow a detection of $^{36}Cl$ with a sensitivity down to $10^{-15}$. All this is achieved using a terminal voltage equal to or less than 2.5 MV.

BRIEF DESCRIPTION OF THE DRAWINGS

The present invention will further be described and elucidated with reference to the drawing, in which.

DETAILED DESCRIPTION OF THE PREFERRED EMBODIMENT

In a preferred embodiment of an apparatus in accordance with the invention means are provided for separating said isotopes from said isobars using an electrostatic and/or magnetic beam splitter, preferably an electrostatic dipole system, and a resolving slit. Particularly focussing means, preferably in the form of a quadrupole multiplet system, are used in combination with the above-mentioned means for separating. As the invention is characterized by an isobaric suppression in two steps, said means for separating and (in combination) said means for focussing are used in the first step, wherein an energy absorbing foil creates an energy difference between the $^{36}Cl$ and $^{36}S$ ions, the quadrupole multiplet system takes care of focussing the beam after passing through the foil, and afterwards an energy analyzer acting as beam splitter removes the majority of the $^{36}S$ ions from the beam.

In a further preferred embodiment of an apparatus according to the invention said means for at least twofold deceleration further comprise a foil being part of a time of flight system measuring the flight time of said isotopes and said isobars between their passage through the foil and their arrival at a detector. Particularly these means are integrated in the second step of the isobaric suppression. The time of flight system preferably comprises focussing means located between the foil and detector, which in particular have the form of a plurality of gridded lenses being able to focus the beam of said isotopes and said isobars while keeping the average velocity thereof at least substantially unchanged regardless of their trajectories through the time of flight system. The lenses are alternatively biased positive, neutral or negative to obtain the focus effect, while keeping the average velocity at least substantially unchanged.

The invention also refers to a process to be used with the apparatus in accordance with the invention.

It is noted that the present invention will be described hereunder with $^{36}$Cl as an example of the ion of interest and $^{36}$S being the interfering isobar. Although $^{36}$Cl being a good candidate to benefit from the present invention, it is not limited thereto, but is generally applicable to the detection of all ions that suffer from isobaric interferences having a lower atomic number Z than the ions of interest.

Figure 1:
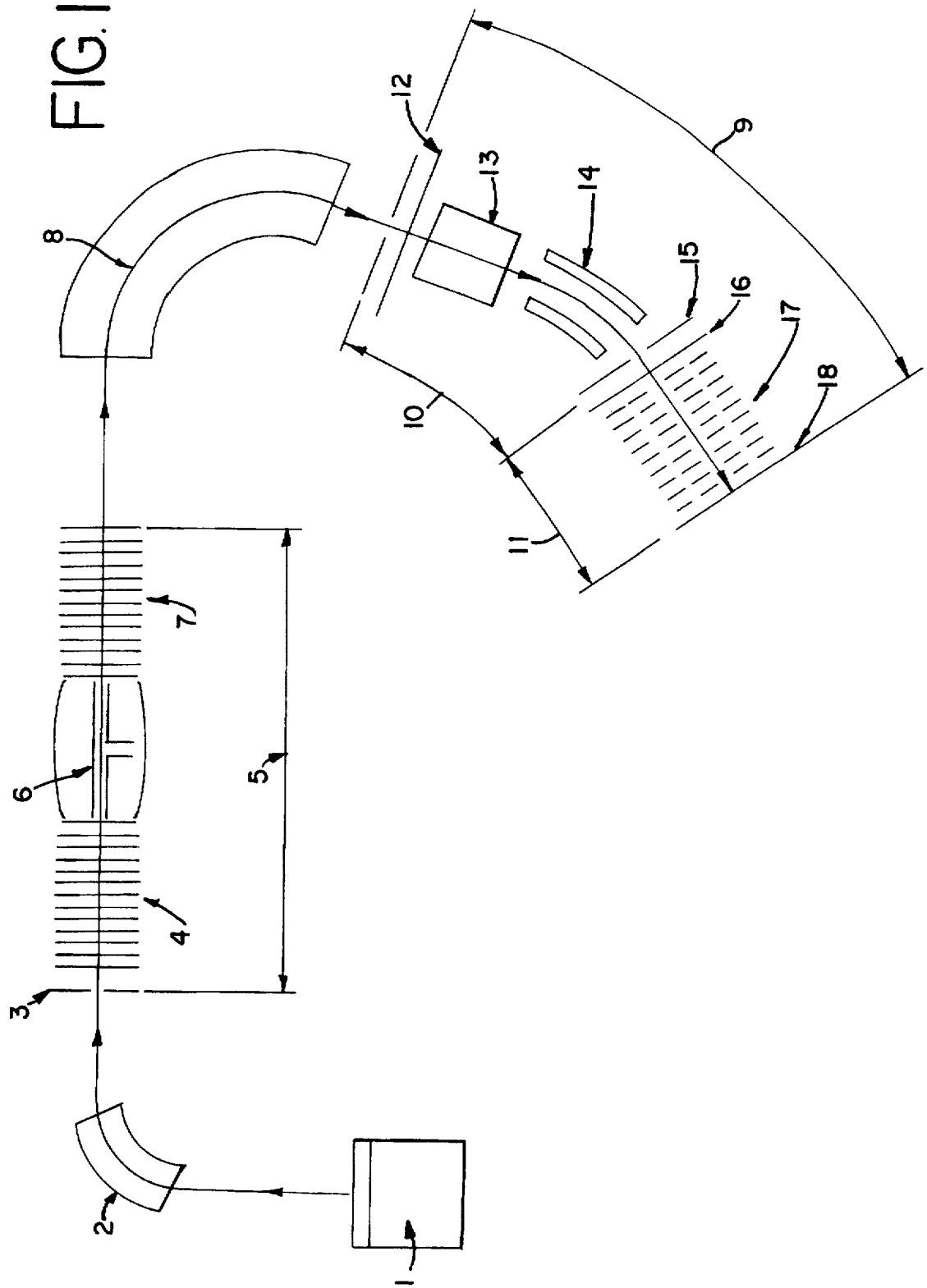
FIG. 1 is a block diagram showing elements of the present invention.

A block diagram showing an AMS system equipped with the present invention is shown in FIG. 1. Basically, the instrument consists of an accelerator mass spectrometer system similar to that described in U.S. Pat. No. 5,273,174 (Purser) with the addition of the present invention beyond the magnetic dipole 8. Negative $^{36}$Cl ions from a suitable ion source 1 are mass analyzed in a magnetic dipole 2 so that only mass 36 particles pass through the selection aperture (or mass defining aperture) 3. Following mass analysis, the selected negative ions are directed into the first acceleration region 4 of a tandem accelerator 5 where they are accelerated to an energy of 2.5 MeV and directed into a gas dissociation canal 6. At an energy of 2.5 MeV, a substantial fraction of the ions leaving the gas dissociation canal 6 will have has six electrons stripped from the negative chlorine ions (see Wittkower, A. B. and Ryding, G. "Equilibrium Charge-State Distribution of Heavy Ions (1–14 MeV)", Physical Review A, 4,226 (1971)) and leave the stripper in a 5+ charge state. These ions are directed into the second acceleration region 7 where they, with a terminal voltage of 2.5 MV, receive a further energy gain of 12.5 MeV and leave the tandem accelerator with a total kinetic energy of 15 MeV. The next step in the AMS system is the mass analysis of the ions leaving the accelerator in a magnetic dipole 8, which provides the initial separation of wanted mass 36 particles from unwanted background ions. Here the most significant class of background which can pass this magnetic filter unimpeded are, apart from $^{36}$S$^{5+}$, $^{35}$Cl$^{5+}$ and $^{37}$Cl$^{5+}$ ions which leave the tandem accelerator with the same magnetic rigidity as 15 MeV $^{36}$Cl$^{5+}$. The origin of such backgrounds is well known by those skilled in the art. It should be mentioned that in the above description the charge state 5+ is chosen as an example but that the selection of other charge states might be equally suitable. Up to this point the geometry of the system is essentially identical to that of the AMS system as described in the aforementioned patent publication of Purser. Unique is a particle detector 9 which follows the magnetic dipole 8 (FIG. 1) and which comprehends a suppression stage 10, for the intensity reduction of isobaric interferences, and a particle identification stage 11 which discriminates the remaining $^{36}$S ions from the $^{36}$Cl ions. Both stages will be described in the following paragraphs.

Suppression stage

Figure 2:
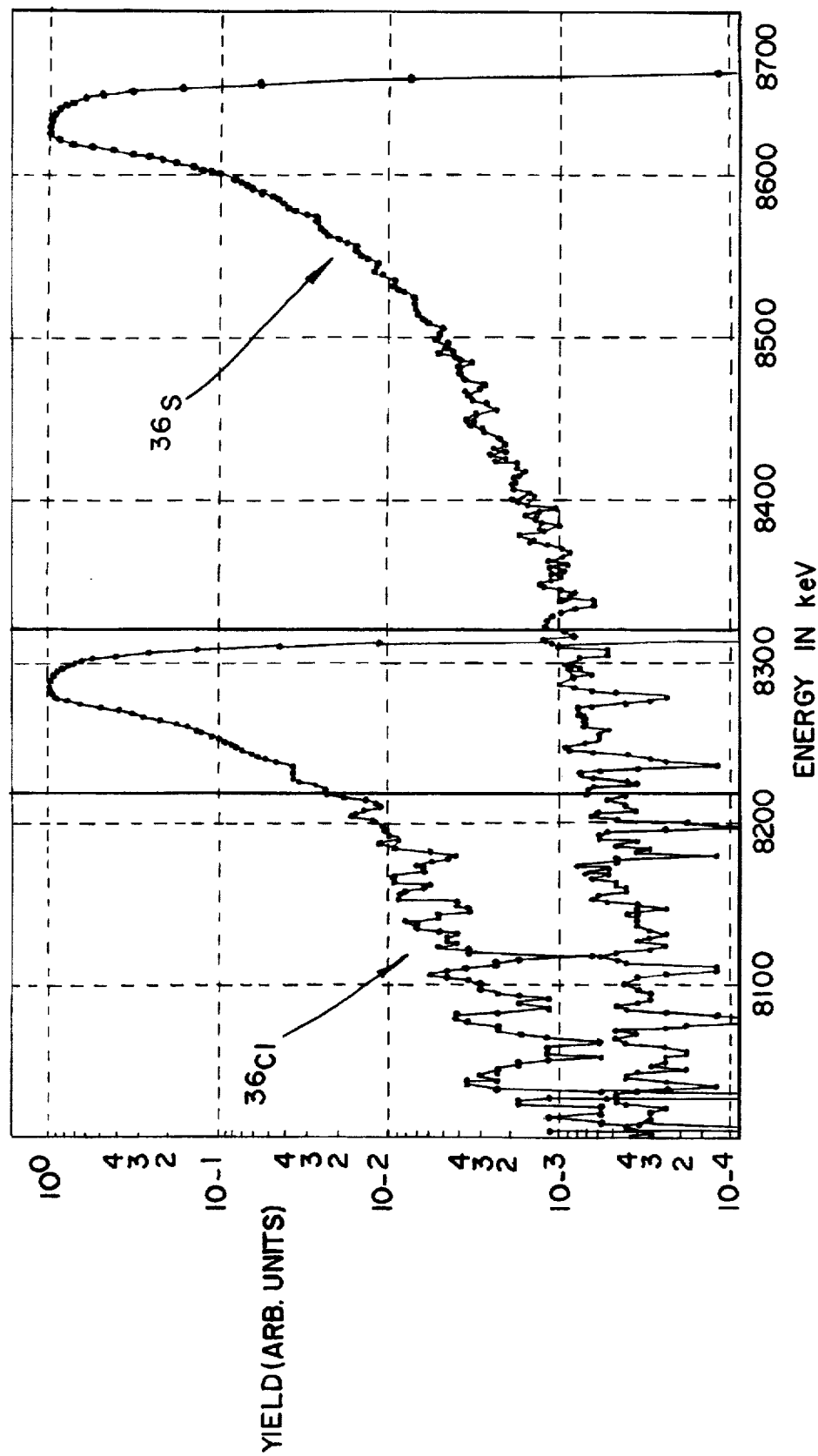
FIG. 2 is a graph showing an energy spectrum of $^{36}Cl$ and $^{36}S$ after passing a foil.
Figure 3:
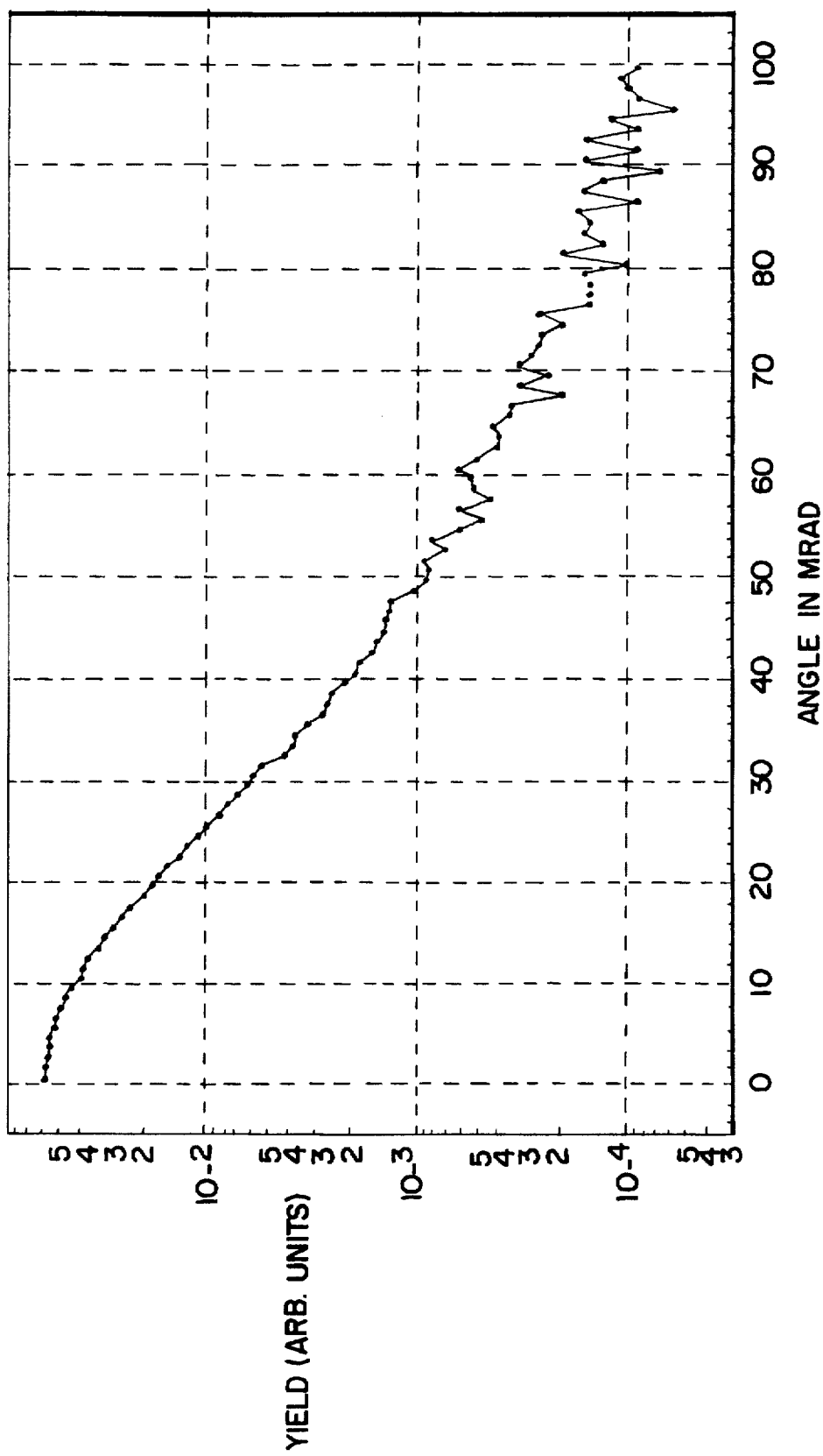
FIG. 3 is a graph showing an angular spectrum of $^{36}Cl$ and $^{36}S$ after passing a foil.

The $^{36}$Cl ions enter the suppression stage through an entrance foil 12 where they are decelerated according to the well known Bethe Bloch relationship:

$$\frac{dE}{dx} \sim \frac{Z^2}{v^2} \tag{1}$$

in which dE/dx is the energy loss of the ions per unit length, Z is the atomic number of the ions and v being the velocity of the ions. Consequently, energy discrimination between $^{36}$Cl and $^{36}$S results from the difference in their Z-value. However, apart from energy discrimination, passage through the foil creates, as known to those skilled in the art, unwanted energy straggling and small angular scattering. FIGS. 2 and 3 show the energy and angular distribution of the $^{36}$Cl and $^{36}$S ions, after the passage through a 2 micrometer thick mylar entrance foil. In these simulations the energy of the ions before the entrance foil was taken to be 15 MeV. After passage through the entrance foil the charge state 8+ (other charge states might be suitable as well) is selected for further transport and the ions pass a special quadrupole multiplet 13, which serves for a proper focussing of the extreme divergent beam on the energy resolving slit 15. Following the quadrupole multiplet an electrostatic dipole (energy analyzer) 14 bends the ions according to their energy. Because of their slightly different energy loss in the foil, $^{36}$S ions have a slightly higher energy than the $^{36}$Cl ions and as a consequence they can be stopped at the energy resolving slit 15. However, as can be seen from FIG. 2, part of the $^{36}$S ions will pass the resolving slit system 15 because the low energy tail of the $^{36}$S ions which extent into the $^{36}$Cl energy window which is determined by the width of the energy resolving slit 15. It is anticipated that the proposed suppression stage will reduce the $^{36}$S intensity by a factor of approximately 1000.

The particle identification stage

The second part of the particle detector directly follows the suppression stage and is formed by a unique particle identification stage 11 which features a velocity measurement of the ions by measuring the flight time of the ions between the moment of passage of the ions through a start foil and the moment of arrival at a stop detector. This technique is called time of flight (TOF) and is well understood by those skilled in the art. The stage consist of the TOF start foil 16, a focussing structure 17 comprising multiple gridded lens elements, and the TOF stop detector 18. Apart from the TOF measurement, the particle identification stage is unique in its optical acceptance of extreme divergent beams, which result from the small angular scattering in the TOF start foil 16. Moreover, the stage keeps the average velocity of the ions at least substantially unchanged, regardless of their trajectories through the focussing structure 17. A detailed description of the particle identification stage is given below.

When the ions are transmitted through the TOF start foil 16 a number of physical processes occur:

1) the $^{36}$Cl and $^{36}$S ions are decelerated according to the relationship [1]. As a result of their different Z-values, the $^{36}$Cl and $^{36}$S ions leave the foil with different velocities, which makes the discrimination of these ions possible in a TOF measurement.

2) A continuum of different charge states of the ions is created which result from charge changing processes with the foil.

3) A pulse of secondary electrons is created when the ions pass the foil. This pulse is detected and used as a starting pulse for the TOF measurement, as is well known by those skilled in the art.

4) Small angular scattering in the foil creates an extreme divergent beam. The extreme divergence of the beam results from the foil thickness that is substantially thicker than foils that are normally applied in TOF experiments. In the present invention such a foil thickness is needed to obtain the wanted velocity difference as described in 1).

Figure 4:
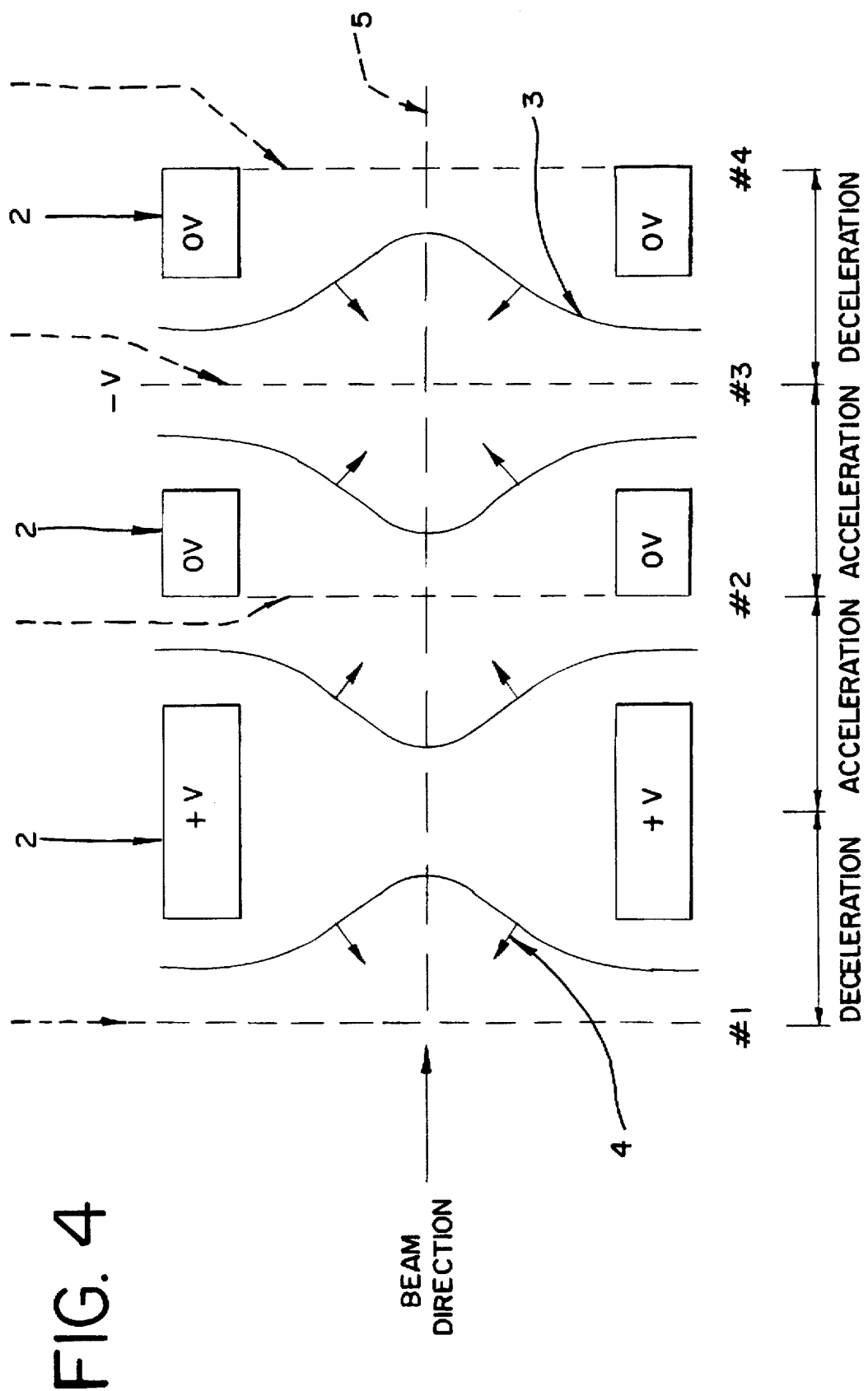
FIG. 4 is a schematic part of a focussing means used in a time of flight system in accordance with the invention.
Figure 5:
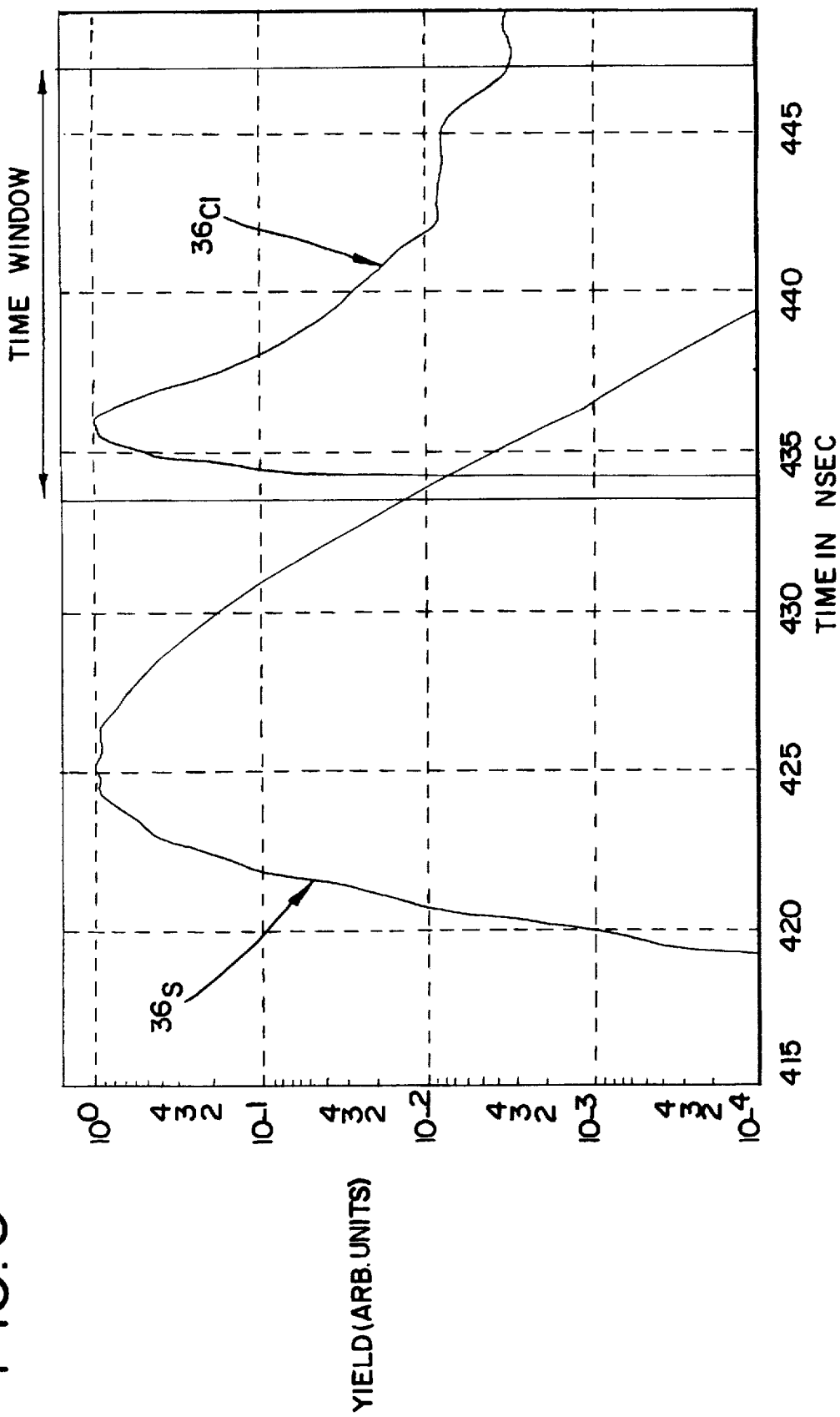
FIG. 5 is a graph showing a timing spectrum of $^{36}Cl$ and $^{36}S$ after passing a foil.

After passage through the foil, some means of focussing is needed to direct the extreme divergent beam onto the TOF stop detector 18. In the present invention this is done by the focussing structure 17 that is located between the TOF start foil 16 and the TOF stop detector 18. The focussing structure 17 should be able to focus the extreme divergent beam that consists of various charge states into a beam spot that is sufficiently small to be detected at the TOF stop detector 18. In addition to this, it should keep the average velocity of the ions undisturbed, regardless of their trajectories through the focussing structure 17. If the last requirement is not fulfilled, there will be timing uncertainty of ions with equal initial velocities and as a consequence the time resolution of the TOF measurement is affected. As known to those skilled in the art, electrostatic focussing elements such as quadrupoles and einzellenses inherently decelerate and/or accelerate ions within the lens structure as a function of their distance to the optical axis. This disturbs the average velocity of the ions transported and affects the flight time in the case of a TOF measurement. In the present invention, focussing action is created in the focussing structure 17 which consist of a number of gridded lenses and which keeps the average velocity of the ions at least substantially unchanged, regardless their trajectories through the focussing structure. FIG. 4 shows a drawing of one section of the focussing structure. It is anticipated however, that in the present invention several such sections will be placed adjacent one another to form the total focussing structure. The section consists of four grids 1 (numbered 1 through 4) which are essentially transparent for ions and three cylindrical electrodes 2, some of which are biased positive, neutral or negative. Some of the equipotential lines 3 and the direction of the electrostatic forces 4 that are experienced by the transported ions are shown as well. Those skilled in the art readily recognize the overall focussing power of such one section because the radial component of the electrostatic force always points to the optical axis 5. More importantly they will also recognize that such a section creates an overall deceleration-acceleration-acceleration-deceleration action on the transported ions as is indicated in the figure. By a proper adjustment of the distances between the grids, the velocity los of the ions between the first two grids can be compensated by the velocity gain between the grids numbers 2 through 4, and consequently a structure can be created which keeps the average velocity of the ions essentially unchanged, regardless their trajectories through the focussing structure. The timing performance of a focussing structure, that comprises 3 individual sections which is capable to deliver the required focussing power and which has a total length of 1.8 meters, has been simulated for the transmission of $^{36}Cl$ and $^{36}S$ ions having an energy of approx. 4 MeV. The result of these simulations, in which the influence of the different charge states of the ions and the small angular scattering were taken into account, is shown in FIG. 5. It can be seen that a timing uncertainty of approximately 1 nanosecond is anticipated, which is low enough to be able to discriminate $^{36}Cl$ and $^{36}S$ in the TOF measurement. It is anticipated in the particle identification stage will further suppress the isobaric $^{36}S$ interference by a factor of approximately 300.

From the above paragraphs it can be seen that a particle detector consisting of the two stages placed adjacent one another as described above is able to suppress $^{36}S$ isobars in a $^{36}Cl$ analysis by a factor $10^5$–$10^6$. Such a suppression is high enough to allow for the detection of $^{36}Cl$ ions in an AMS analysis with a sensitivity of approx. $10^{-15}$.

What is claimed is:

1. Apparatus for use in the field of accelerator mass spectrometry in the detection of low concentrations of preselected isotopes including, but not limited to chlorine-36 configured to suppress isobaric interferences from isobar elements having a lower atomic number Z than said isotopes comprising means for an at least twofold deceleration of said isotopes and said isobar elements by their interaction with matter in order to create an energy difference between said isotopes and said isobar elements based on the Z-dependence of their deceleration.

2. Apparatus according to claim 1, wherein said deceleration means comprises a foil acting as interacting matter.

3. Apparatus according to claim 1, wherein said deceleration means comprises a gas acting as interacting matter.

4. Apparatus according to claim 1, wherein said deceleration means comprises a plasma acting as interacting matter.

5. Apparatus according to claim 1, comprising means for separating said isotopes from said isobar elements using an electrostatic and/or magnetic beam splitter, and a resolving slit.

6. Apparatus according to claim 5 comprising focusing means, including a quadrupole multiple system.

7. Apparatus according to claim 1, wherein said deceleration means further comprises a foil being part of a time of flight system measuring the flight time of said isotopes and said isobar elements between their passage through the foil and their arrival at a detector.

8. Apparatus according to claim 7, wherein the time of flight system comprises focusing means located between the foil and the detector.

9. Apparatus according to claim 8, wherein the focusing means are provided with a plurality of gridded lenses being able to focus the beam of said isotopes and said isobar elements while keeping the average velocity thereof at least substantially unchanged regardless of their trajectories through the time of flight detector.

10. Apparatus according to claim 9, wherein the lenses are alternatively biased positive, neutral or negative.

11. Apparatus according to claim 1 configured to be used in combination with a tandem accelerator operating at a terminal voltage of at least substantially below 5 MV.

* * * * *